(12) United States Patent
Jakus et al.

(10) Patent No.: US 9,199,789 B2
(45) Date of Patent: Dec. 1, 2015

(54) EXPLOSION VENT INCLUDING BUCKLE TAB PLATE

(75) Inventors: Guy Jakus, Zemst (BE); Tom Eijkelenberg, Westerlo (BE); Guido Dom, Olen (BE)

(73) Assignee: FIKE CORPORATION, Blue Springs, MO (US)

( * ) Notice: Subject to any disclaimer, the term of this patent is extended or adjusted under 35 U.S.C. 154(b) by 888 days.

(21) Appl. No.: 13/408,429

(22) Filed: Feb. 29, 2012

(65) Prior Publication Data

US 2013/0225064 A1    Aug. 29, 2013

(51) Int. Cl.
*F16K 17/40* (2006.01)
*B65D 90/34* (2006.01)
*B64C 1/00* (2006.01)

(52) U.S. Cl.
CPC ........... *B65D 90/34* (2013.01); *B64C 2001/009* (2013.01)

(58) Field of Classification Search
USPC ............ 454/340, 358, 367; 137/68.25, 68.27; 50/1; 220/89.1
See application file for complete search history.

(56) References Cited

U.S. PATENT DOCUMENTS

| | | | |
|---|---|---|---|
| 4,206,692 A * | 6/1980 | Johnston | 454/367 |
| 4,385,710 A | 5/1983 | Kurihara et al. | |
| 4,498,261 A | 2/1985 | Wilson et al. | |
| 4,612,739 A | 9/1986 | Wilson | |
| 4,656,793 A * | 4/1987 | Fons | 52/98 |
| 4,899,960 A * | 2/1990 | Hararat-Tehrani et al. | 244/118.5 |
| 5,036,632 A * | 8/1991 | Short et al. | 52/1 |
| 5,085,017 A * | 2/1992 | Hararat-Tehrani | 52/1 |
| 5,461,831 A | 10/1995 | Michal | |
| 5,606,829 A | 3/1997 | Hararat-Tehrani | |
| 5,638,980 A | 6/1997 | Parks | |
| 6,055,774 A * | 5/2000 | Muddiman | 49/141 |
| 6,070,365 A * | 6/2000 | Leonard | 52/1 |
| 6,280,142 B1 * | 8/2001 | Pruden et al. | 416/146 A |
| 6,367,203 B1 * | 4/2002 | Graham et al. | 52/1 |
| 6,435,455 B1 * | 8/2002 | Holman et al. | 244/118.5 |
| 6,570,749 B1 * | 5/2003 | Ling et al. | 361/102 |
| 7,628,167 B2 | 12/2009 | Eijkelenberg et al. | |

(Continued)

FOREIGN PATENT DOCUMENTS

EP          0408613         9/1994

OTHER PUBLICATIONS

International Search Report and Written Opinion dated Jun. 7, 2013 in the corresponding PCT/US2013/028244 application filed on Feb. 28, 2013.

*Primary Examiner* — Steven B McAllister
*Assistant Examiner* — Frances F Hamilton
(74) *Attorney, Agent, or Firm* — Hovey Williams LLP

(57) ABSTRACT

Improved, non-fragmenting, high efficiency vent apparatus (10, 78) are provided for protecting a structure (12) from potentially damaging or destructive abnormal pressure conditions. The apparatus (10, 78) is positioned in covering relationship to a vent opening (14) formed in the structure (12), and generally includes a burst member (16) and a tab assembly (18) equipped with a series of tabs (56); the tabs (56) bend or buckle to a burst member-clearing position when the vent apparatus (10, 78) experiences an abnormal pressure condition, thereby permitting rapid opening of a central section of the burst member (16) to thus protect structure (12). The burst member (16) may be of domed or flat construction, and can be in the form of a quadrate panel or any other desired shape.

24 Claims, 4 Drawing Sheets

(56) References Cited

U.S. PATENT DOCUMENTS

| | | |
|---|---|---|
| 8,714,483 B2 * | 5/2014 | Hoetzeldt et al. .......... 244/118.5 |
| 2005/0103786 A1 * | 5/2005 | Eijkelenberg et al. ....... 220/89.2 |
| 2005/0248137 A1 * | 11/2005 | Delventhal et al. .......... 280/739 |
| 2008/0036188 A1 * | 2/2008 | Gould et al. ................. 280/739 |
| 2008/0041454 A1 * | 2/2008 | Eijkelenberg et al. ..... 137/68.23 |
| 2009/0185333 A1 * | 7/2009 | Coomer et al. ............... 361/622 |
| 2011/0017315 A1 | 1/2011 | Farwell et al. |
| 2011/0303665 A1 * | 12/2011 | Wilson ......................... 220/89.1 |
| 2012/0000548 A1 * | 1/2012 | Khamitkar ................. 137/68.25 |
| 2012/0248108 A1 * | 10/2012 | Goodyear et al. ....... 220/203.01 |

* cited by examiner

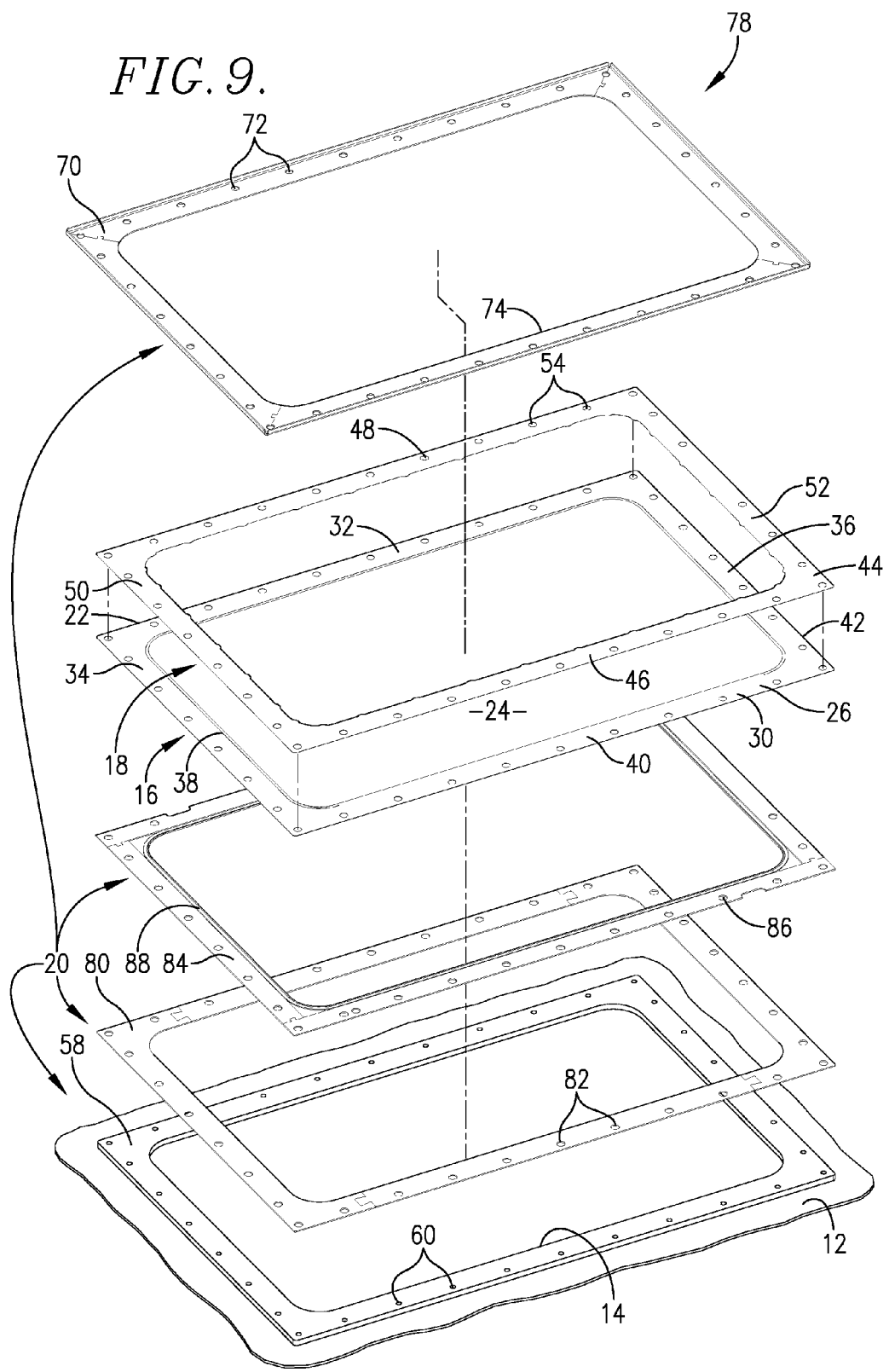

EXPLOSION VENT INCLUDING BUCKLE TAB PLATE

BACKGROUND OF THE INVENTION

1. Field of the Invention

The present invention is broadly concerned with vent apparatus of the type used to protect structures (e.g., bag houses, bins, and tanks) from the potentially destructive effects of abnormal pressure conditions therein, i.e., either excessively high or low pressures which could lead to catastrophic failure of the structure. More particularly, the invention is concerned with such vent apparatus having a rupturable burst member normally retained in place by means of a plurality of spaced apart, bendable, non-fragmenting tabs; in the event of an abnormal pressure condition, the tabs bend or buckle without breakage thereof to a member-clearing position allowing the burst member to quickly open to thus vent and protect the structure. The vent tabs are preferably designed as simple, low-mass, torque and load insensitive components which are advantageously out of contact with the protected area within the structure, and provide increased venting efficiency without any rupture or fragmentation of the tabs.

2. Description of the Prior Art

A wide variety of protective devices have been employed in the past to protect confined areas or zones, such as in buildings, manufacturing facilities, tanks, chambers, and other structures. These devices are intended to quickly terminate or interrupt potentially destructive phenomena, such as high pressure conditions conducive to explosions or fires. Generally speaking, venting assemblies are used in this context which include a rupturable member such as a rupture disc or burst panel. Such components are responsive to pressure conditions within a structure to be protected, and are designed to open and vent the structure in the event of an abnormal pressure condition. In some cases, these burst discs or panels fragment upon actuation thereof, but in other instances venting occurs with retention of the disc or panel.

U.S. Pat. No. 5,606,829 describes a mounting assembly for a decompression panel used in aircraft and having blow-out tabs arranged in pairs around the margin of the panel. The tabs are designed to break in the even of an over- or under-pressure condition, which serves to release the panel.

U.S. Patent Publication 2011/0017315 describes a pressure relief panel for a silo or dust collector having a line of weakness along the panel perimeter, which may be a series of slits that form tabs. The number of slits/tabs controls the pressure differential at which the panel will open.

U.S. Pat. No. 4,385,710 is directed to an emergency pressure relief device for an oil-reserve tank or the like, having a flexible plate secured to a coaming with welds intervals, and flexible sealant between the welds. The length and strength of the welds determines the burst pressure.

U.S. Pat. No. 5,036,632 is directed to a pressure relief panel assembly for tanks, food-processing vessels, and bag houses, having a rupture panel with a hinged blow-out part 22 connected to a restrained part via a plurality of rupture tabs with slits there between. The thickness of the material of the panel and the length of the slits determines the burst pressure.

Other references include U.S. Pat. Nos. 4,385,710, 5,461, 831, 5,638,980, 6,367,203, and 7,628,167.

The above-described prior art references do not teach or suggest provision of a vent apparatus with a burst member normally maintained in place by means of non-fragmenting bendable tabs which move to a member-clearing position when the burst member experiences an abnormal pressure condition.

SUMMARY OF THE INVENTION

The present invention provides improved, non-fragmenting vent assemblies for protecting a variety of structures subject to abnormal pressure conditions. Generally speaking, the vent apparatus of the invention includes a burst member presenting an outer margin and a tab assembly including a plurality of spaced apart, non-frangible tabs in proximal relationship to the burst member outer margin. Mounting structure is provided to operably mount the burst member and tab assembly adjacent a vent opening in an area or structure to be protected. The tabs are configured and oriented to overlie the burst member outer margin in the unopened condition thereof when the burst member experiences only normal pressure conditions. The tabs at least partially serve to maintain the burst member in its closed position under normal pressures. In the event of an abnormal pressure condition, such as one which could damage the protected structure, the tabs are operable to bend or buckle to a member-clearing position without fragmentation of the tabs, to thereby permit the burst member to rapidly open to relieve the abnormal pressure condition.

In preferred forms, the burst member may be of flat or domed construction, and can be any desired shape, such as quadrate or round. The burst member margin is advantageously configured with a line of opening throughout at least a portion thereof, with the tabs adjacent and overlying the line of opening, in order to establish the desired normal maintenance of the burst member in its closed position. A seal is provided to prevent egress of fluid (e.g., gas or liquid), from the protected structure through the line of opening.

The mounting structure for the burst member/tab assembly preferably comprises upper and lower open frames with the burst member and tab assembly there between, along with threaded fasteners for maintaining the entire vent apparatus in place.

BRIEF DESCRIPTION OF THE DRAWINGS

FIG. 9 is a perspective assembly view of the vent apparatus illustrated in FIG. 8.

DETAILED DESCRIPTION OF THE PREFERRED EMBODIMENT

Figure 1:
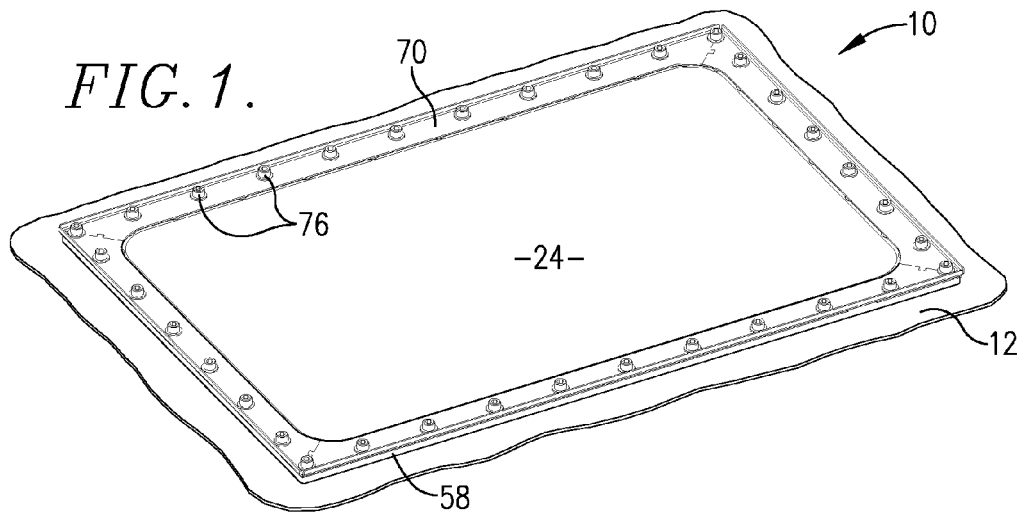
FIG. 1 is a perspective view of a complete vent apparatus in accordance with one embodiment of the invention, mounted on a structure to be protected.

Turning now to the drawings, a vent apparatus 10 in accordance with the invention is illustrated in FIG. 1, appropriately mounted on a structure 12 to be protected. The structure 12 has a vent opening 14 of predetermined configuration and size, and the apparatus 12 is in normal covering relationship to the opening 14. As explained hereinafter, the apparatus 10 is designed to quickly open in the event of an abnormal (e.g., excessively high or excessively low) pressure within structure 12, in order to vent the structure and prevent damage to or destruction thereof. The apparatus 10 broadly includes a burst member 16, a tab assembly 18, and mounting structure 20 serving to operatively mount the burst member 16 and tab assembly 18 relative to vent opening 14. Generally, the components of the apparatus 10 are of metallic, open-frame design; in stacked, face-to-face relationship with each other; in surrounding relationship to vent opening 14; and secured to structure 12 by suitable connectors. All of the components have a peripheral open frame design save for burst member 16 which covers the opening 14.

Figure 2:
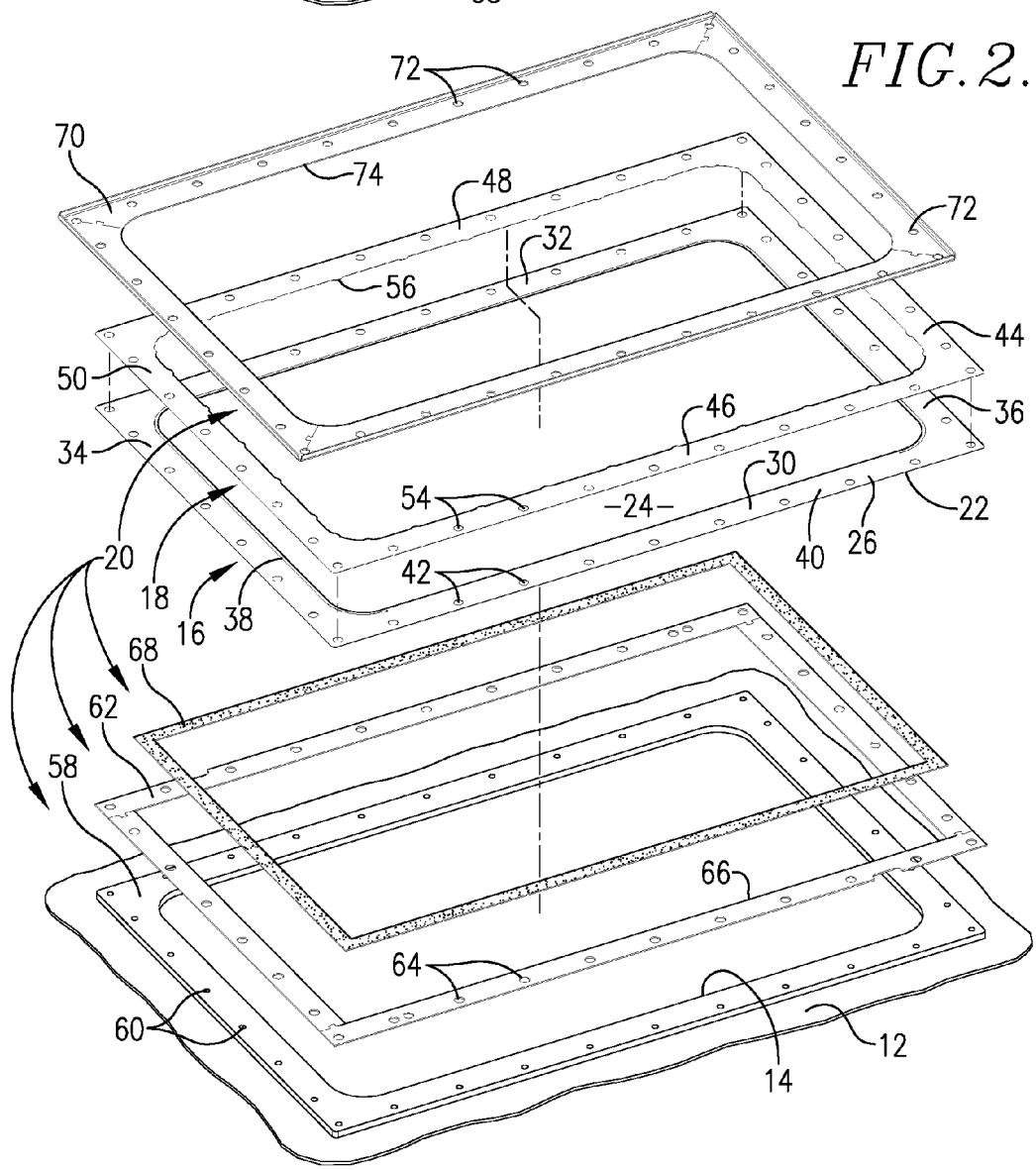
FIG. 2 is a perspective assembly view of the vent apparatus illustrated in FIG. 1.

In more detail, the burst member 16 in the illustrated embodiment is in the form of a generally quadrate metallic burst panel 22 having a central domed burst section 24 and a continuous, essentially flat peripheral margin 26. A continuous transition region 28 provides a demarcation between the section 24 and margin 26. Referring to FIG. 2, it will be seen that the panel margin 26 includes opposed front and rear sections 30 and 32, as well as opposed side sections 34 and 36. A line of opening 38 extending completely through the thickness of margin 26 extends from the corner between sections 30 and 34, throughout the lengths of sections 34, 32, and 36, and terminates at the corner between sections 30 and 36. In alternate embodiments, the line of opening 38 may extend only partially through the thickness of margin 26, as opposed to an entirely through cut. Further, line of opening 38 may also be discontinuous comprising, for example, a series of spaced apart cuts or slits. A non-cut hinge region 40 extends between the opposed ends of the line of opening, along the length of front section 30. Additionally, a series of mounting apertures 42 are provided around the entire margin 26. The burst member 16 is advantageously formed of a metal, such as stainless steel, and has an appropriate thickness and other properties, depending upon the desired rated burst capacity.

Figure 3:
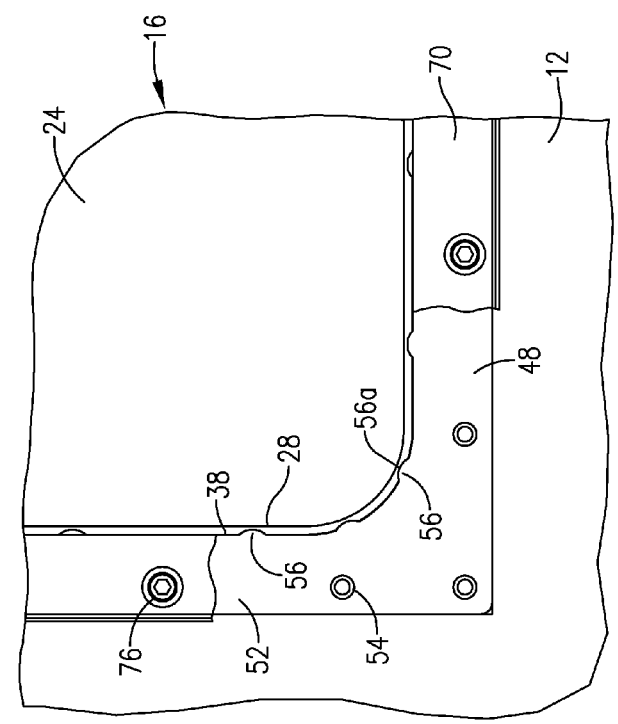
FIG. 3 is an enlarged, fragmentary view, with parts broken away, illustrating a vent tab plate adjacent the burst member of the assembly of FIGS. 1-2, with the vent tabs of the plate maintaining the burst member in its unopened position.
Figure 5:
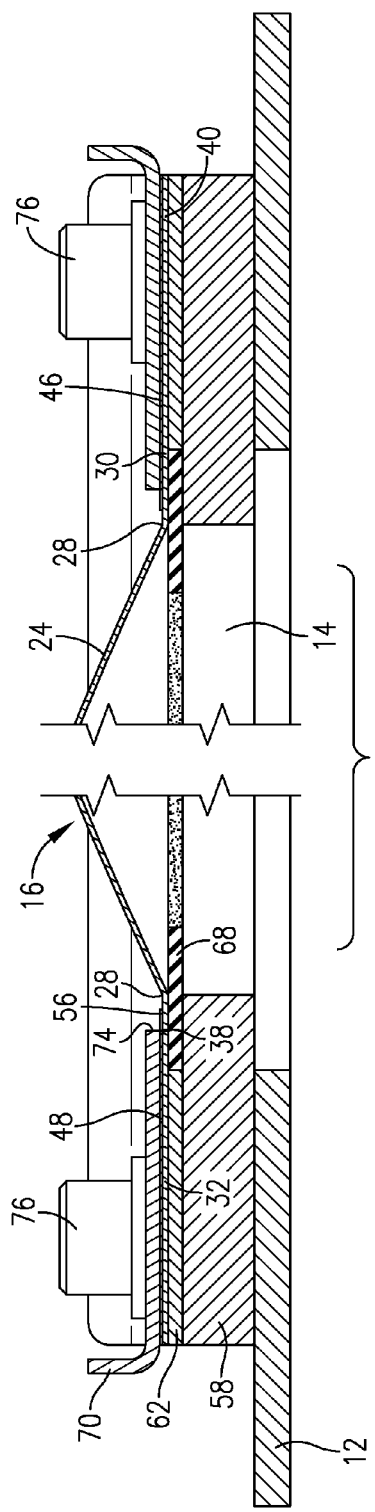
FIG. 5 is an enlarged, vertical sectional view of the vent apparatus depicted in FIGS. 1-2, with the burst panel in its unopened condition.

The tab assembly 18 is in the form of a tab frame 44 which abuts burst member 16. To this end, the tab frame 44 has opposed front and rear sections 46, 48, and side sections 50, 52 designed to overlie the sections 32-36 of burst member 16. The frame sections 46-52 are also provided with mounting apertures 54 which are in registry with the apertures 42. The inner margin of tab frame 44 has a series of integral, spaced apart, inwardly extending, non-frangible tabs 56 with gently arcuate inner surfaces 56a which overlie the line of opening 38, but are just short of the transition region 28 (FIGS. 3 and 5). It is understood, however, that tabs 56 may comprise other shapes and configurations, such as quadrate or trapezoidal, which may include rounded corners to prevent puncturing burst member 16 upon opening thereof.

The mounting structure 20 includes a bottom frame 58, which is secured to the structure 12 in surrounding and overlying relationship to vent opening 14. The frame 58 includes a plurality of threaded connector bores 60. The mounting structure 20 further includes a seal frame 62 with mounting apertures 64 and presenting an inner margin 66. The seal frame 62 rests directly atop the bottom frame 58. A continuous gasket seal 68 is situated within the confines of seal frame 62 along the inner margin 66 thereof. As best seen in FIG. 5, the seal 68 is partially supported by bottom frame 58, extends inwardly therefrom, and is in covering relationship to line of opening 38. A top frame 70, having mounting apertures 72, is positioned over the tab frame 44 and has an inner periphery 74 along the bases of the tabs 56 and directly adjacent the line of opening 38 (see FIG. 5). Bottom frame 58 also extends inwardly of inner margin 66 and inner periphery 74 so as to provide a support for burst panel 22, and especially line of opening 38, and thereby offering resistance to inward shifting of the burst panel should the protected structure 12 be subject to vacuum conditions or normal cycling of pressures within the protected structure. The mounting structure 20 further has a plurality of screws 76, which extend through the mounting apertures 72, 54, 42, and 64 and are received within the bores 60.

During normal use of structure 12 when no abnormal pressure conditions exist, the vent assembly 10 is static and the burst panel 22 remains intact in blocking relationship to the vent opening 14 formed in the protected structure 12. In this condition, flow of fluid (e.g., gas) from the protected structure 12 through line of opening 38 is prevented by the presence of gasket seal 68. Furthermore, the presence of the tabs 56 serves to at least partially maintain the dome section 24 of burst panel 22 in its closed position. Preferably, the tabs 56 constitute the sole means of maintaining the burst panel 22 in the closed position thereof.

Figure 6:
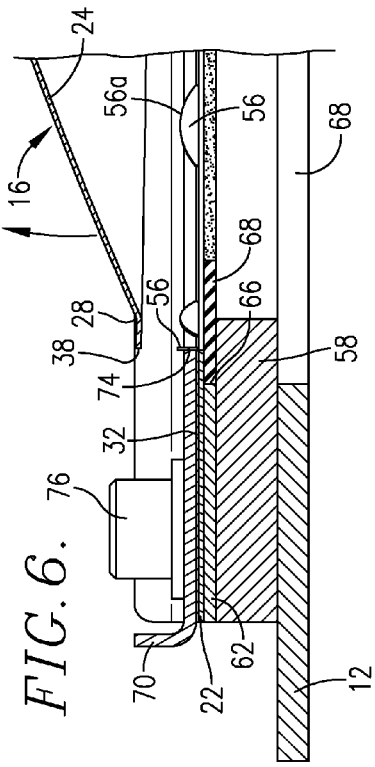
FIG. 6 is an enlarged, fragmentary, sectional view illustrating the burst member of the vent apparatus during opening thereof, with the vent tabs being bent to a member-clearing position.
Figure 7:
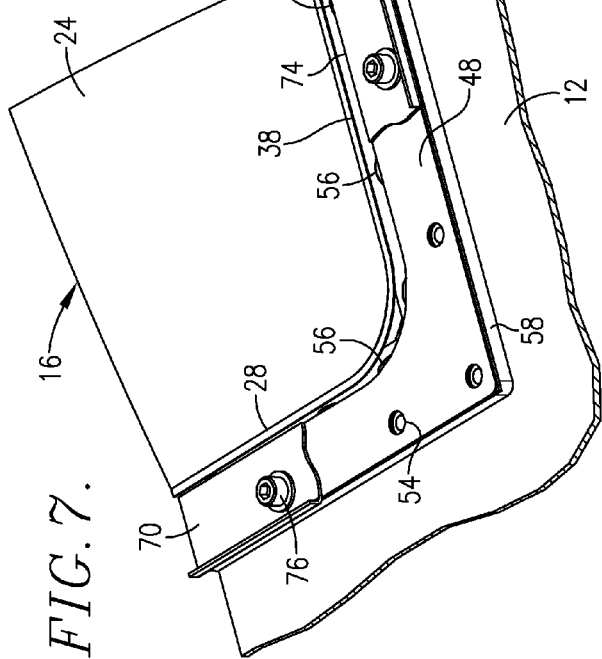
FIG. 7 is a fragmentary, perspective view, with parts broken away, further illustrating the burst member during opening thereof.
Figure 4:
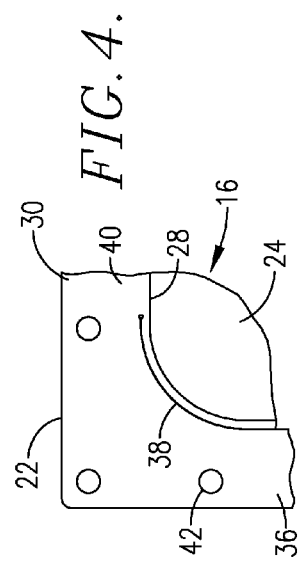
FIG. 4 is an enlarged, fragmentary view of a corner of the burst member, illustrating the hinge section thereof.

However, in the event of an abnormal pressure condition, the dome section 24 of burst panel 22 opens to vent the structure 12. This opening occurs along the length of line of opening 38, with the hinge region 40 serving to prevent the dome section 24 from entirely separating from the vent apparatus 10. Furthermore, as the dome section 24 opens, the inwardly extending tabs 56 bend or buckle outwardly about the inner periphery 74 of top frame 70 (see FIGS. 6 and 7), to an upright orientation, as opposed to being substantially co-planar with the rest of tab frame 44. This creates a clearance between the tabs 56 and the line of opening edge of dome section 24, thus allowing rapid opening of the dome section 24. It will be observed that this opening action occurs without any breakage or fragmentation of the tabs 56 along the length of line of opening 38. In addition, the tabs 56 along the length of the hinge region 40 also bend upwardly as necessary to accommodate movement of the dome section 24. It will be appreciated that tabs 56 along the hinge region 40 are not essential to the operation of vent apparatus 10. However, their presence is preferred so as to facilitate manufacture of the tab frame 44 and to absorb some of the energy generated as a result of opening of the dome section 24 to prevent failure of the hinge region and fragmentation of the panel 22.

Figure 8:
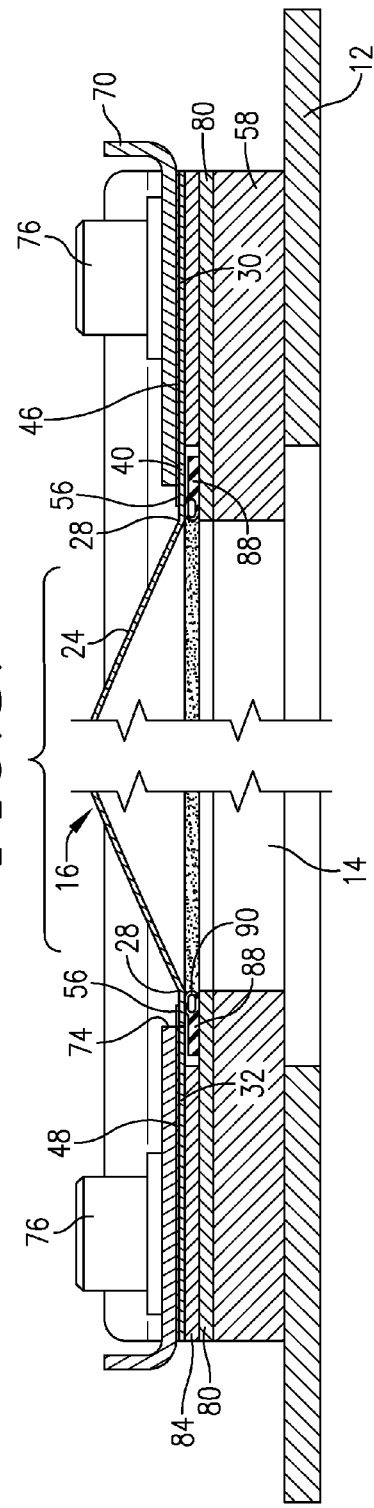
FIG. 8 is an enlarged, vertical sectional view of a vent apparatus in accordance with another embodiment of the invention, including a modified sealing arrangement.

FIGS. 8-9 depict another vent apparatus 78. The apparatus 78 is very similar to apparatus 10 and the components of apparatus 78 identical to those of apparatus 10 are identically numbered. The apparatus 78 differs from apparatus 10 in a number of respects. First, the apparatus 78 has a support plate 80 having mounting apertures 82, positioned over base frame 58; and a spacer frame 84 having mounting apertures 86 overlying the support plate 80. The spacer frame 84 is equipped with a modified gasket seal 88 having a continuous, hollow, innermost bead 90 (e.g., a "P" seal). It will be seen that the gasket 88 terminates at the edge of base frame 58 and support plate 80, and does not extend into opening vent opening 14. The screws 76 extend through the registered mounting openings 72, 54, 42, 86, and 82, and are received within the bores 60 of base frame 58. Spacer frame 84 prevents overcompression of gasket seal 88 during assembly of apparatus 78. The design of FIGS. 8-9 provides a more robust seal, as compared with the design of FIGS. 1-7. The operation of vent apparatus 78 is identical to that of apparatus 10, and thus need not be further described.

The vent apparatus of the invention provides a number of desirable features. The design provides a single element explosion vent with the complete elimination of rupture tabs. As such, the rated burst condition for the vent apparatus hereof is not dependent upon the material thickness of the burst panel, but rather the deformation or bending characteristics of the tabs 56. Furthermore, the tabs 56 are not in contact with the vent opening 14, so that temperature and/or corrosive conditions within the protected structure 12 do not significantly alter the operation of the vent assembly. The vent tab design is inherently simple and is insensitive to both torque and load. While the vent apparatus hereof is more usually used in the context of protecting against abnormally high pressures, it can equally be employed in a low pressure or vacuum condition context.

We claim:

1. Vent apparatus comprising:
   a burst member presenting a central section and an outer peripheral margin separated by a line of opening;
   a tab assembly comprising a continuous peripheral plate and including a plurality of inwardly projecting, spaced apart, non-frangible tabs in proximal relationship to said burst member outer peripheral margin; and
   a mounting structure operably supporting said burst member and tab assembly adjacent an area to be protected,
   said tabs configured and oriented to overlie said central section in the unopened condition thereof when the burst member experiences a first pressure condition,
   said tabs bending to a position which clears the central section without fragmentation of the tabs, when said burst member experiences a second pressure condition of predetermined magnitude that is different than said first pressure condition and which biases the burst member against the tabs, to thereby permit the said central section to open and relieve the second pressure condition.

2. The vent apparatus of claim 1, said tabs being in contact with said central section.

3. Vent apparatus comprising:
   a burst member comprising a central section and an outer peripheral margin separated by a line of opening;
   a tab assembly including a plurality of spaced apart, non-frangible tabs in proximal relationship to said burst member outer peripheral margin; and
   a mounting structure operably supporting said burst member and tab assembly adjacent an area to be protected,
   said tabs configured and oriented to overlie said central section in the unopened condition thereof when the burst member experiences a first pressure condition,
   said tabs bending to a position which clears the central section without fragmentation of the tabs, when said burst member experiences a second pressure condition of predetermined magnitude different than said first pressure condition and which biases the burst panel against the tabs, to thereby permit the central section to open and relieve the second pressure condition,
   said mounting structure comprising:
      a bottom frame configured for securement to a construction to be protected and including an inner edge in surrounding relationship to a vent opening of said construction, and an outboard face remote from said structure;
      a top frame positioned adjacent said burst member and tab assembly located proximal to said bottom frame outboard face such that the burst member and tab assembly are located between the top and bottom frames; and
      one or more connectors securing the top frame, burst member, and tab assembly to said bottom frame.

4. The vent apparatus of claim 3, said mounting structure further including a spacer plate between said bottom frame and said burst member and having an inner edge, and a continuous gasket seal adjacent said spacer inner edge, said tabs and burst member margin abutting said seal.

5. Vent apparatus comprising:
   a burst member comprising a central section and an outer peripheral margin separated by a line of opening;
   a tab assembly including a plurality of spaced apart, non-frangible tabs in proximal relationship to said burst member outer peripheral margin; and
   a mounting structure operably supporting said burst member and tab assembly adjacent an area to be protected,
   said tabs configured and oriented to overlie said central section in the unopened condition thereof when the burst member experiences a first pressure condition,
   said tabs bending to a position which clears the central section without fragmentation of the tabs, when said burst member experiences a second pressure condition of predetermined magnitude different than said first pressure condition, to thereby permit the central section to open and relieve the second pressure condition,
   said burst member being a panel of generally domed configuration.

6. The vent apparatus of claim 1, said line of opening extending along at least a portion of the burst member adjacent the burst member outer peripheral margin to define said central section in the burst member, said central section opening along said line of opening when the burst member experiences said second pressure condition.

7. The vent apparatus of claim 6, said burst member line of opening extending only partially around said central section, the burst member having an uncut hinge section which remains connected to said central section in the event the central section opens.

8. The vent apparatus of claim 7, said tabs located in overlying relationship to said line of opening.

9. Vent apparatus comprising:
   a burst member presenting a central section and an outer peripheral margin separated by a line of opening;
   a tab assembly including a plurality of spaced apart, non-frangible tabs in proximal relationship to said burst member outer peripheral margin; and
   a mounting structure operably supporting said burst member and tab assembly adjacent an area to be protected,
   said tabs configured and oriented to overlie said central section in the unopened condition thereof when the burst member experiences a first pressure condition,
   said tabs bending to a position which clears the central section without fragmentation of the tabs, when said burst member experiences a second pressure condition of predetermined magnitude different than said first pressure condition, to thereby permit the central section to open and relieve the second pressure condition,
   each of said tabs having an arcuate inner margin.

10. Vent apparatus comprising:
    a burst member presenting a central section and an outer peripheral margin separated by a line of opening;
    a tab assembly including a plurality of spaced apart, non-frangible tabs in proximal relationship to said burst member outer peripheral margin; and a mounting structure operably supporting said burst member and tab assembly adjacent an area to be protected, said tabs configured and oriented to overlie said central section in the unopened condition thereof when the burst member experiences a first pressure condition, said tabs bending to a position which clears the central section without fragmentation of the tabs, when said burst member experiences a second pressure condition of predetermined magnitude different than said first pressure condition, to thereby permit the central section to open and relieve the second pressure condition, said tabs formed of metal.

11. Vent apparatus comprising:

a burst member presenting a central section and an outer peripheral margin separated by a line of opening;

a tab assembly including a plurality of spaced apart, non-frangible tabs in proximal relationship to said burst member outer peripheral margin; and a mounting structure operably supporting said burst member and tab assembly adjacent an area to be protected, said tabs configured and oriented to overlie said central section in the unopened condition thereof when the burst member experiences a first pressure condition, said tabs bending to a position which clears the central section without fragmentation of the tabs, when said burst member experiences a second pressure condition of predetermined magnitude different than said first pressure condition, to thereby permit the central section to open and relieve the second pressure condition, said burst member being a panel of generally quadrate configuration.

12. A method of protecting a structure subject to an over-pressure or an under-pressure condition, said structure having a vent opening, said method comprising the steps of:

placing a vent apparatus in normally blocking relationship to said vent opening, said vent apparatus including:

a burst member covering said vent opening, said burst member comprising a central section and presenting an outer peripheral margin separated by a line of opening, and a tab assembly comprising a continuous peripheral plate and including a plurality of inwardly projecting, spaced apart tabs adjacent and overlying said outer peripheral margin and in a position to block movement of the burst member away from said vent opening;

maintaining said burst member in said covering relationship while said structure experiences a first pressure condition; and in the event that said structure experiences a second pressure condition of a predetermined magnitude that is different than said first pressure condition, causing said tabs to bend without fragmentation thereof to a central section-clearing position to allow opening of the central section.

13. The method of claim 12, including the step of preventing complete detachment of said central section from said structure.

14. The combination, comprising:

a construction subject to an over-pressure or an under-pressure condition, said construction having a vent opening;

a vent apparatus in normally blocking relationship to said vent opening, said vent apparatus including— a burst member presenting a central section and an outer peripheral margin separated by a line of opening and in covering relationship to said vent opening;

a tab assembly comprising a continuous peripheral plate and including a plurality of inwardly projecting spaced apart, non-frangible tabs in proximal relationship to said burst member outer peripheral margin; and a mounting structure operably supporting said burst member and tab assembly on said structure adjacent said vent opening, said tabs configured and oriented to overlie said central section in the unopened condition when the burst member experiences a first pressure condition, said tabs bending to a position which clears the central section without fragmentation of the tabs, when said burst member experiences a second pressure condition of predetermined magnitude that is different than said first pressure condition, and which biases the burst member against the tabs, to thereby permit the central section to open.

15. The combination of claim 14, said tabs being in contact with said central section.

16. The combination comprising:

a construction subject to an over-pressure or an under-pressure condition, said construction having a vent opening;

a vent apparatus in normally blocking relationship to said vent opening, said vent apparatus including— a burst member presenting a central section and an outer peripheral margin separated by a line of opening and in covering relationship to said vent opening;

a tab assembly including a plurality of spaced apart, non-frangible tabs in proximal relationship to said burst member outer peripheral margin; and a mounting structure operably supporting said burst member and tab assembly on said structure adjacent said vent opening, said tabs configured and oriented to overlie said central section in the unopened condition when the burst member experiences a first pressure condition, said tabs bending to a position which clears the central section without fragmentation of the tabs, when said burst member experiences a second pressure condition of predetermined magnitude that is different than said first pressure condition, and which biases the burst member against the tabs, to thereby permit the central section to open, said mounting structure comprising:

a bottom frame secured to said construction and including an inner edge in surrounding relationship to said vent opening, and an outboard face remote from said construction, a top frame positioned adjacent said burst member and said tab assembly located proximal to said bottom frame outboard face;

such that the burst member and tab assembly are located between the top and bottom frames; and one or more connectors securing the top frame, burst member, and tab assembly to said bottom frame.

17. The combination of claim 16, said mounting structure further including a spacer plate between said bottom frame and said burst member and having an inner edge, and a continuous seal adjacent said spacer inner edge, said tabs and burst member margin abutting said seal.

18. The combination comprising:

a construction subject to an over-pressure or an under-pressure condition, said construction having a vent opening;

a vent apparatus in normally blocking relationship to said vent opening, said vent apparatus including:
  a burst member presenting a central section and an outer peripheral margin separated by a line of opening, and in covering relationship to said vent opening;
  a tab assembly including a plurality of spaced apart, non-frangible tabs in proximal relationship to said burst member outer peripheral margin; and
  a mounting structure operably supporting said burst member and tab assembly on said structure adjacent said vent opening,
  said tabs configured and oriented to overlie said central section in the unopened condition when the burst member experiences a first pressure condition,
  said tabs bending to a position which clears the central section without fragmentation of the tabs, when said burst member experiences a second pressure condition of predetermined magnitude that is different than said first pressure condition, to thereby permit the central section to open
  said burst member being a panel of generally domed configuration.

19. The combination of claim 14, said line of opening extending along at least a portion of the burst member adjacent the burst member outer peripheral margin to define said central section in the burst member, said central section opening along said line of opening when the burst member experiences a pressure above said predetermined magnitude.

20. The combination of claim 19, said burst member line of opening extending only partially around said central section, the burst member having an uncut hinge section which remains connected to said central section in the event the central section opens.

21. The combination of claim 20, said tabs located in overlying relationship to said line of opening.

22. The combination comprising:
  a construction subject to an over-pressure or an under-pressure condition, said construction having a vent opening;
  a vent apparatus in normally blocking relationship to said vent opening, said vent apparatus including:
    a burst member presenting a central section and an outer peripheral margin separated by a line of opening, said burst member in covering relationship to said vent opening;
    a tab assembly including a plurality of spaced apart, non-frangible tabs in proximal relationship to said burst member outer peripheral margin; and
    mounting structure operably supporting said burst member and tab assembly on said structure adjacent said vent opening,
    said tabs configured and oriented to overlie said central section in the unopened condition when the burst member experiences a first pressure condition,
    said tabs bending to a position which clears the central section without fragmentation of the tabs, when said burst member experiences a second pressure condition of predetermined magnitude that is different than said first pressure condition and which biases the central section against the tabs, to thereby permit the central section to open,
  each of said tabs having an arcuate inner margin.

23. The combination comprising:
  a construction subject to an over-pressure or an under-pressure condition, said construction having a vent opening;
  a vent apparatus in normally blocking relationship to said vent opening, said vent apparatus including:
    a burst member presenting a central section and an outer peripheral margin separated by a line of opening, said burst member in covering relationship to said vent opening;
    a tab assembly including a plurality of spaced apart, non-frangible tabs in proximal relationship to said burst member outer peripheral margin; and
    a mounting structure operably supporting said burst member and tab assembly on said structure adjacent said vent opening,
    said tabs configured and oriented to overlie said central section in the unopened condition when the burst member experiences a first pressure condition,
    said tabs bending to a position which clears the central section without fragmentation of the tabs, when said burst member experiences a second pressure condition of predetermined magnitude that is different than said first pressure condition and which biases the central section against the tabs, to thereby permit the central section to open,
  said tabs formed of metal.

24. The combination comprising:
  a construction subject to an over-pressure or an under-pressure condition, said construction having a vent opening;
  a vent apparatus in normally blocking relationship to said vent opening, said vent apparatus including:
    a burst member presenting a central section and an outer peripheral margin separated by a line of opening, said burst member in covering relationship to said vent opening;
    a tab assembly including a plurality of spaced apart, non-frangible tabs in proximal relationship to said burst member outer peripheral margin; and
    a mounting structure operably supporting said burst member and tab assembly on said structure adjacent said vent opening,
    said tabs configured and oriented to overlie said central section in the unopened condition when the burst member experiences a first pressure condition,
    said tabs bending to a position which clears the central section without fragmentation of the tabs, when said burst member experiences a second pressure condition of predetermined magnitude that is different than said first pressure condition and which biases the central section against the tabs, to thereby permit the central section to open,
  said burst member being a burst panel of generally quadrate configuration.

\* \* \* \* \*